J. A. HARDEL.
APPARATUS FOR AND PROCESS OF LINING WELLS.
APPLICATION FILED FEB. 26, 1919.

1,339,955.

Patented May 11, 1920.
3 SHEETS—SHEET 1.

INVENTOR

Jean Amedée Hardel

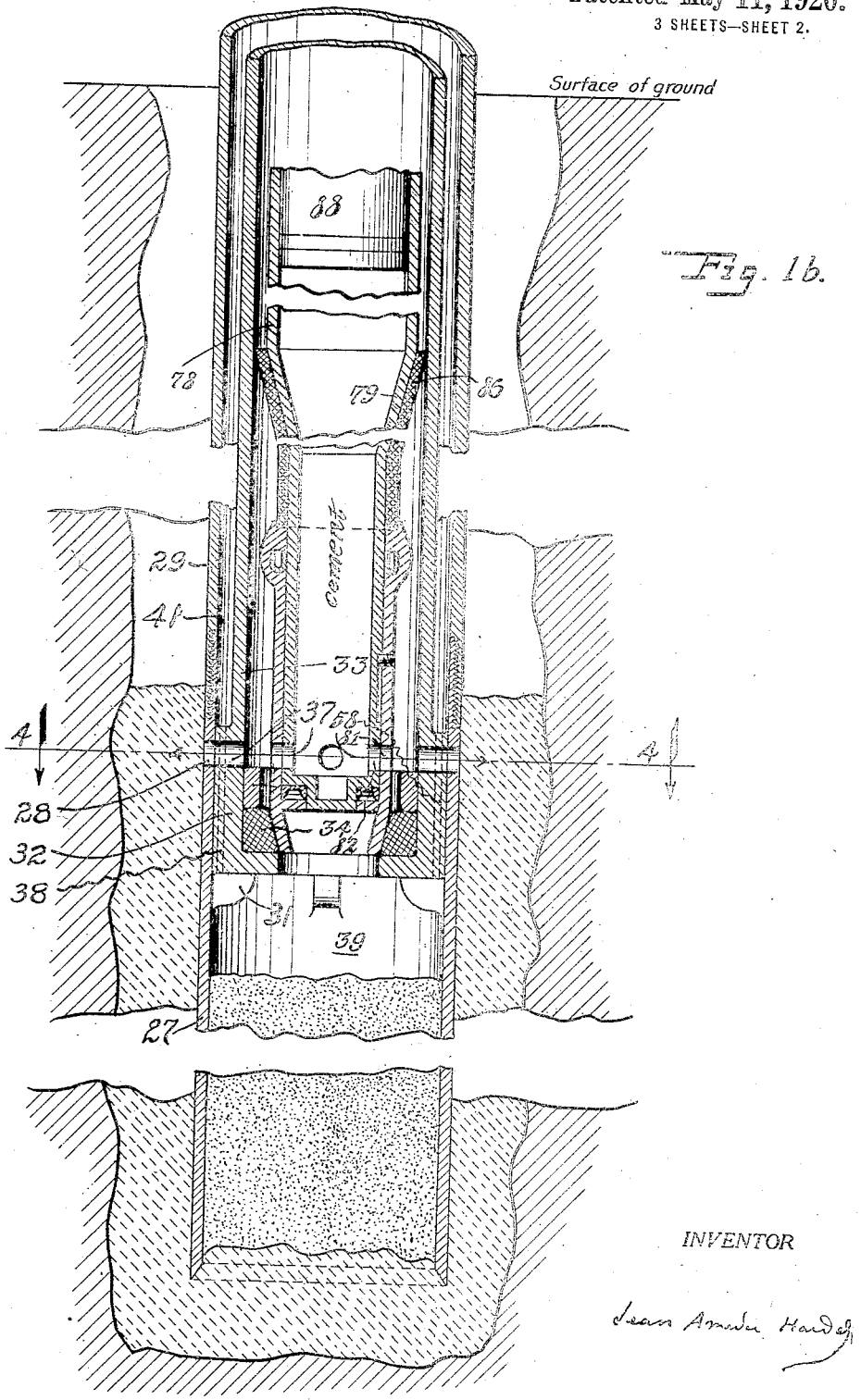

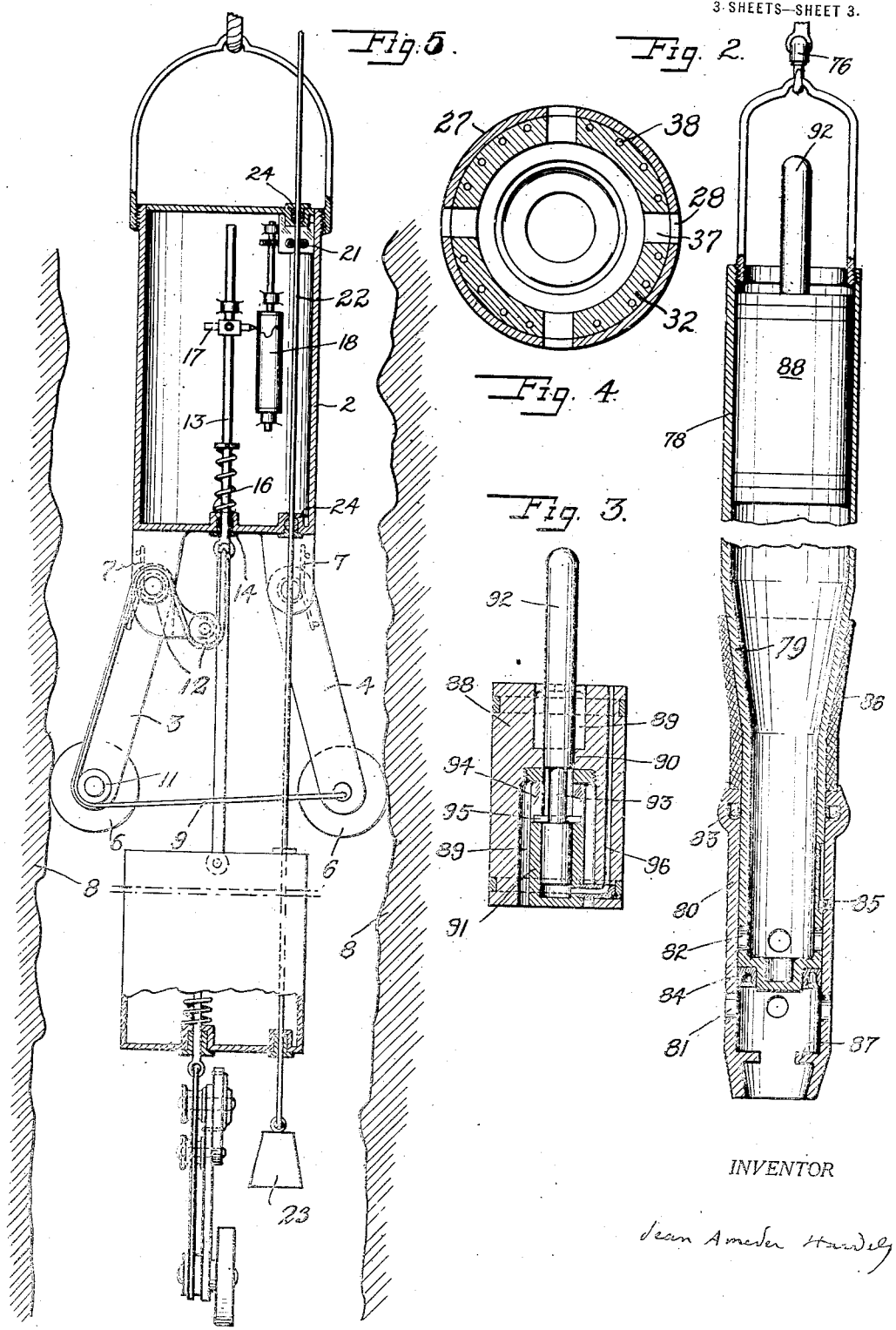

UNITED STATES PATENT OFFICE.

JEAN AMEDÉE HARDEL, OF PARIS, FRANCE.

APPARATUS FOR AND PROCESS OF LINING WELLS.

1,339,955.　　　　Specification of Letters Patent.　　Patented May 11, 1920.

Application filed February 26, 1919. Serial No. 279,387.

*To all whom it may concern:*

Be it known that I, JEAN AMEDÉE HARDEL, a citizen of France, and a resident of the city of Paris, France, have invented a new and useful Apparatus for and Process of Lining Wells, of which the following is a specification.

My invention relates to the art of lining a well with cement.

An object of the invention is to provide a process for lining wells, and especially oil wells, with cement to prevent caving of the well and to seal off water therefrom.

Another object of the invention is to provide an apparatus for carrying out my process.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figures 1ª and 1ᵇ combined constitute a broken vertical sectional view of the apparatus of my invention, showing it in position in a well and casing. Portions of the figure are broken away to reduce its length.

Figs. 2 and 3 are vertical sectional views of parts of the apparatus, a portion being broken away in Fig. 2 to reduce the length of the figure.

Fig. 4 is a horizontal sectional view taken on the line 4—4 of Fig. 1.

Fig. 5 is a vertical sectional view through a measuring apparatus used in connection with my invention.

Figure 1A:
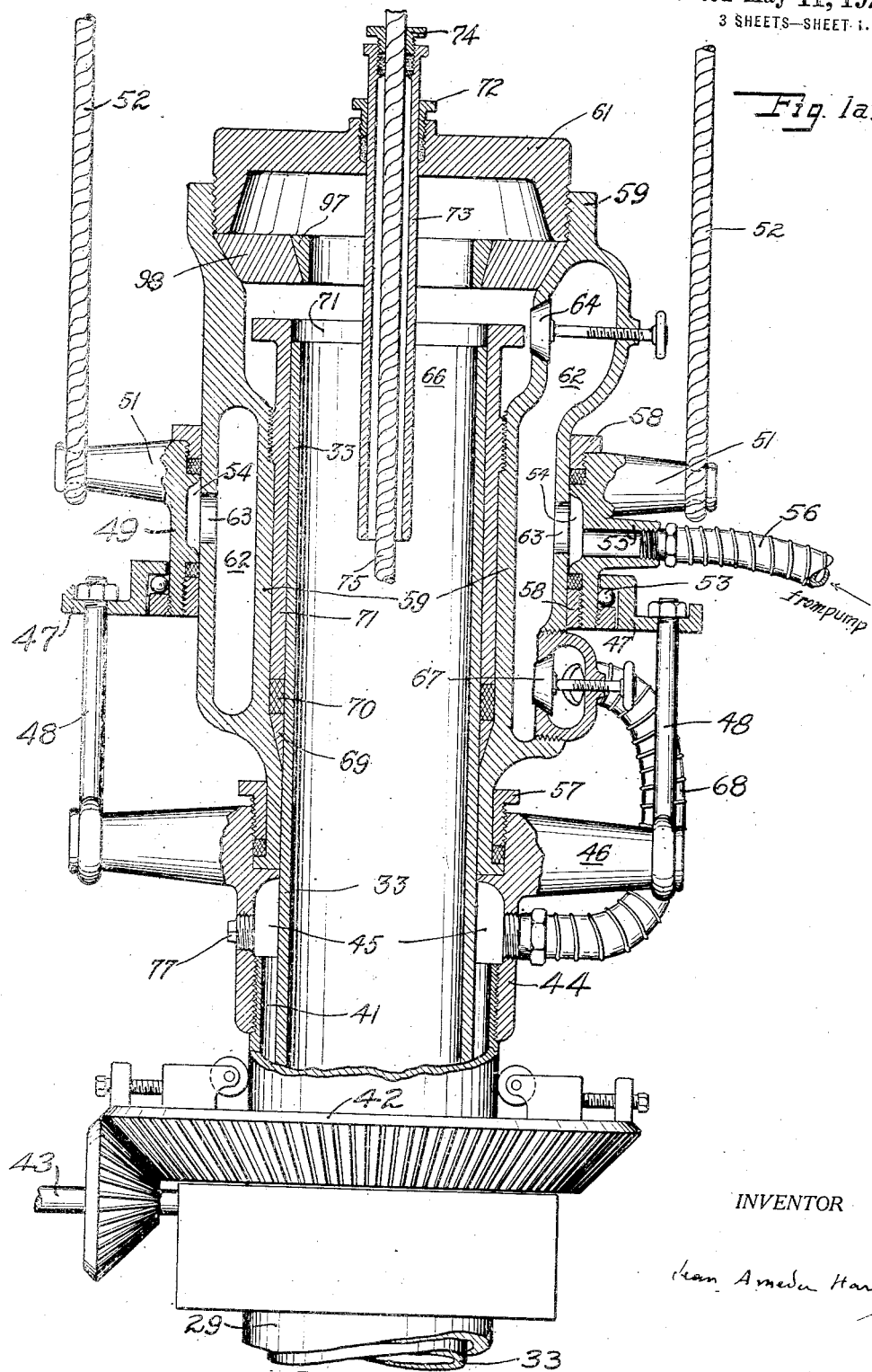

It is contemplated that my invention will find its chief application in oil wells of moderate depth and in which the water pressure is not excessive. The broad purpose of the invention is to provide an apparatus for and method of lining a well with cement so that the commonly used metallic casing may be dispensed with. The various steps of my process may be stated in general terms to include:

1. The measurement of the well and calculation of the quantity of cement needed.

2. The introduction into the well of a hollow revoluble mold at the end of a casing, the initial position of the mold being a short distance above the bottom of the well.

3. The introduction of a quantity of cement into the bottom of the well and the lowering of the casing and mold to force the cement upwardly about the mold for its entire length.

4. The introduction of sand into the mold.

5. The introduction of cement into the casing adjacent the mold in a closed container to keep it free from premature contact with water.

6. Injecting the cement into the well about the casing and mold.

7. Simultaneously with the injection of cement, rotating the mold to effect the even packing of the cement and prevent the freezing of the mold, and drawing the mold upwardly a determined distance, permitting the sand in the mold to pass therefrom to form a supporting core for the cement.

8. The removal, by washing, of all surplus cement above the point of last injection of cement.

9. Repeating steps 4 to 8 inclusive until the successive increments of cement have reached the top of the well.

10. The removal of the sand core after the cement has set.

If desired the sand introduced into the casing mold may be mixed with a solution of a salt such as calcium chlorid or more particularly sodium silicate to accelerate the setting of the cement surrounding the sand core.

Sodium silicate solution, by reacting chemically with the cement, causes such a rapid setting of the latter that a surface layer of hardened cement is formed as the mold is withdrawn of sufficient thickness and strength to make the use of a sand core unnecessary.

Further, in a dry well, the use of either sand or sodium silicate is not necessary, as the cement will remain in place after being pressed against the sides of the well by the mold. In this case, it is advisable to enlarge the end of the mold to compress the cement to a greater extent than is necessary in a wet well.

*Measuring device.*

In order to avoid excessive waste of cement, or what is still more serious, the use of an insufficient amount, it is necessary to know with approximate accuracy the volume of cement needed for the lining between determined points in the well. The lining of the well is effected in successive increments, of say, twenty feet, and the volume for each increment should be known. For producing a graphic record of the cross section of the well at all points, I have provided an apparatus illustrated in Fig. 6 which is lowered into the well and then withdrawn. Variations in the diameter of the bore are automatically recorded during the descent and again during the ascent of the device, and from the data thus secured the cross section at any given depth may be determined and the volume of cement needed for any given increment may be calculated with approximate accuracy.

A closed casing 2 is provided at its lower end with pivotally mounted arms 3 and 4, each provided with a roller 6 at its outer end. Springs 7, arranged about the pivot pin of each arm, resiliently force the arms outwardly so that the rollers are at all times pressed against the sides 8 of the bore. A wire 9 is secured to one of the arms and passed over a pulley 11 on the other arm, and from thence over pulleys 12, and connected to a rod 13, passing through the stuffing box 14 into the casing. The rod is arranged for axial movement, and a spring 16 effects the upward recovery of the rod when it has been pulled downwardly. As the device is lowered into the well, the arms move toward and away from each other as the diameter of the bore varies, thus pulling the rod 13 downwardly as they spread and permitting it to rise as they approach each other. A pencil 17 is fixed on the rod, and as the rod moves in accordance with variations in the cross section of the bore, a line is traced upon the record sheet 18 which is suitably mounted to move in a direction transverse to the axial movement of the rod. The record sheet 18 is actuated by suitable connections with a pair of rollers 21, frictionally engaging a wire 22 suspended stationarily in the well and held taut by a weight 23 at its lower end. The wire passes into and out of the casing through stuffing boxes 24, and since it is held stationary, movement of the casing effects a rotation of the rollers 21 and consequent proportional movement of the record sheet. The sheet is previously prepared by suitable rulings to correspond with successive divisions of the bore of the well and the proportion of parts is such that the record sheet is moved past the pencil at a speed proportioned to the speed of the casing, so that the recorded line furnishes a basis upon which the cross section of the well at any point may be determined. Two such devices as I have just explained may be arranged one above the other as shown in Fig. 5, their respective arms arranged to move in planes at right angles to each other so that the cross section of the bore may be known in two directions. The use of three or more such devices properly coördinated enables the cross section of the well at any point to be determined with a high degree of accuracy. Several of these devices may be fixed on the same casing.

*Mold and casing.*

The mold 27 comprises a length of casing which conveniently may be about thirty-two feet long. The bottom of the mold is open and apertures 28 are arranged adjacent the upper end which is joined to the outer casing 29, which supports and protects that portion of the apparatus within the well. A short distance below the upper end of the mold, lugs 31 are arranged to form a seat upon which the enlarged end 32 of the inner casing 33 rests. The inner casing is of smaller diameter than the outer casing, and is enlarged at its lower end to form a working fit in the upper part of the mold. The extreme end of the casing 33 is provided with an internal flange upon which is seated a resilient packing ring 34 having a conical aperture therethrough and surmounted by a metallic ring 36. Two types of bailers are used to convey material to the mold, one, an ordinary dump bailer slightly modified by the addition of lugs so that it may find support upon the ring 36; and the other a bailer of special design illustrated in Fig. 2 which seats in the ring 34 and is sealed or packed thereby in the lower end of the casing 33. Just above the ring 36, the casing is provided with apertures 37, so placed as to be in register or out of register with the apertures 28 according to the relative rotative positions of the inner and outer casings. Apertures 38 are also formed lengthwise through the enlarged end of the casing to provide a passage between the mold chamber 39 and the annular chamber 41 between the inner and outer casing.

The upper part of the outer casing is run through a turn table 42 of known design, by which the casing may be rotated by the shaft 43, connected to any suitable source of power. Threaded upon the upper end of the outer casing is a housing 44 forming an annular chamber 45 about the end of the outer casing, and opening into the chamber 41 between the casings. The housing is provided with lugs 46 and is suspended from the collar 47 by links 48. The collar 47 is in turn supported upon the ring 49, provided with lugs 51, to which the slings 52 of the supporting cable are attached. Friction-reducing means 53 are interposed between the ring 49 and the collar 47. From the above it will be clear that the outer casing is supported from the collar 47 and may be rotated on the ring 49 which is fixed relative to the rest of the apparatus. The ring 49 is formed to inclose an annular chamber 54, connected by nipple 55 and conductor 56 with a pump.

Seated in the top of the housing 44 and rotatably secured therein by the gland and packing 57; and within the supporting ring 49 and rotatably secured therein by the glands and packing 58, is a housing 59, which with the cap 61 surrounds and incloses the open upper end of the inner casing 33. The housing 59 is formed with an annular chamber 62 having apertures 63 opening into the chamber 54. A port closed by valve 64 connects the chamber 62 with the inside of the housing and hence with the chamber 66 within the inner casing; and a port closed by the valve 67 connects the chamber 62 with the flexible conduit 68 connected into the chamber 45 and hence with the chamber 41 between the inner and outer casings 33 and 29 respectively. Thus, water from the pump may be directed as desired into either the chamber 66 or the chamber 41, irrespective of the limited rotation of the inner casing within the outer casing and housing 44; or the rotation of both casings and housings upon the relatively fixed supporting ring 49. Interposed between the upper part of the inner casing 33 and the housing 59 is a split wedge ring 69 and resilient packing 70, surmounted by the gland 71. When the parts are assembled the gland is tightened down to pack the casing in the housing and secure it thereto, so that by a suitable tool applied to the upper end of the housing 59 the inner casing may be rotated relative to the outer one to move the apertures 37 and 28 into or out of register as the case may be.

Slidably and rotatably arranged in the stuffing box 72 in the cap 61 is a tube 73, itself provided with a stuffing box 74, through which a cable 75 passes. The cable terminates in a swivel hook 76, Fig. 2, from which is hung the bailer in which material is conveyed to the bottom of the inner casing. The stuffing boxes permit the upper end of the housing to be sealed so that a water pressure may be maintained in the casings, and the swivel hook and rotatable tube 73 permits the bailer to rotate with the casing, without twisting its supporting cable 75. A discharge port normally closed by the plug 77 is formed in the lower housing.

Bailer.

The bailer 78 comprises as many lengths of flush-joint pipe as needed to hold the quantity of cement to be introduced. The lower end of the bailer is cylindrical and of smaller diameter than the main body being connected thereto by a tapered portion 79. A sleeve 80 is slidably arranged on the lower end of the bailer and is provided with ports 81. The bottom of the bailer is closed, and ports 82 are formed in the walls adjacent the bottom. Two leather cups 83 and 84 pack the joint between the sleeve and the bailer, and a pin 85 prevents the sleeve from rotating and from slipping off when the bailer is pulled. A resilient packing ring 86 is arranged above the sleeve and upon the tapered portion 79.

When the bailer is lowered to the bottom of the inner casing, the tapered end of the sleeve 80 seats in the resilient packing ring 34 and with continued movement of the bailer, the lower end thereof slides downwardly in the now stationary sleeve until stopped by the lugs 87, when the ports 81 and 82 are fully registered. With the descent of the bailer into the sleeve, the packing ring 86 is forced upwardly upon the larger portion of the bailer and wedged between the bailer and the casing 33 thus forming a tight packing therebetween. The parts are so proportioned that when the sleeve seats in the bottom of the casing, the centers of ports 81 are in the same plane as the centers of ports 37 and 28. With the packing rings 86 and 34 respectively above and below the ports, the contents of the bailer may be injected into the bore of the well on the outside of the casing when the ports 37 and 28 are registered, none of the material escaping into either the casing chamber 66 or the mold chamber 39. After the injection of the bailer contents, the bailer is pulled, the weight of the sleeve causing it to slide down to first position, thus allowing the packing ring 86 also to slide downwardly on the tapered portion to free itself from the casing.

After filling the bailer with cement to be injected, a plunger 88 is placed in the upper part on top of the cement. The plunger comprises a piston formed to provide a close working fit with the inside of the bailer and is provided with means for permitting water to pass downwardly through it when it is desired to remove it from the bailer. The plunger is formed with a passage 89 passing longitudinally through it, the size of the passage being restricted by the internal flange 90 for a short distance. In the lower part of the passage 89, a flanged thimble 91 is secured, and slidably arranged in the flange 90 and the thimble is a rod or stem 92 having a reduced portion 93 of smaller diameter than the main portion and normally within the thimble immediately below the flange 90. Formed in the top of the thimble are slots 94 and lugs 95 near the end of the reduced portion 93 are engaged in the slots. A by-pass 96 connects the top of the piston with the interior of the thimble so that the water pressure on both sides of the rod 92 is equalized. The plunger is forced downwardly to eject the cement from the bailer by water pressure in the casing and bailer above the plunger, and during this operation there is no tendency for the valve mechanism to open if by chance there should be a difference of pressure above and below the plunger. When it is desired to withdraw the plunger the stem is caught and pulled upwardly until the lugs 95 engage the tops of the slots, when the plunger proper moves upwardly with the stem. In this position of the parts a passage is formed between the flange 90 and the reduced portion 93 the water in the bailer above the plunger passing downwardly through this passage about the lugs 95, through the slots 94 and into the lower passage 89 whence it escapes into the bailer below the plunger. A simple valve, with a stem, would give the same general result, but the valve would be raised during the motion downward, if for any reason the pressure below the plunger should become higher than the pressure above it. With the above device the stem is not raised, even in case of difference of pressure, and no liquid can pass through this plunger before the stem is pulled.

In assembling the bailer in the top of the casing, slips 97 and bushing 98 are used in the usual way.

*Operation of apparatus and method of procedure.*

If a casing has been necessary in drilling the well, the casing is first pulled, the well being left full of muddy water. The measuring apparatus illustrated in Fig. 5 is utilized to secure a graphic record of the cross section of the bore and the quantities of cement needed is calculated therefrom. The casings are assembled and run into the well with the mold at the lower end of the outer casing, and the housings at the top as shown in Fig. 1, except that the cap 61 and slips 97 are not needed at this time, and the ports 37 and 28 are out of register. The lower end of the mold is held a proper distance above the bottom of the well, and a quantity of cement conveyed in the ordinary dump bailer to the bottom of the inner casing and discharged into the mold whence it passes to the bottom of the well. With the cap 61 in place and the casing full of water and slowly rotating, it is then lowered so that the bottom end of the mold is quite close to the bottom of the well, thus forcing the cement upwardly about the outside of the entire mold, the quantity being estimated, so that this first increment or foundation, will reach up past the ports 28. From this point on each increment is conveniently about twenty feet in length. Sufficient sand is now introduced into the mold by means of a dump bailer to fill, say, twenty feet of the lined well, plus a liberal margin. As each successive increment of lining is placed, sand is discharged from the mold to form a retaining core within the increments previously placed. I therefore prefer to put the first quantity of sand into the mold for a height of about twenty-six feet, so that a surplus of about four feet is left in the mold when it is drawn upwardly a distance of twenty feet during the placing of the second increment.

The bailer illustrated in Fig. 2, is next assembled in the upper part of the casing and loaded with cement estimated to be sufficient for about twenty feet of lining, plus twenty to thirty per cent. more to be on the safe side. The plunger 88 is put in the bailer on top of the cement, and the bailer run down to its seat at the end of the inner casing, the supporting cable 75 passing through the stuffing box, tube and cap as shown in the upper part of Fig. 1. The seating of the bailer registers or uncovers the ports 81 and 82, and the packing rings 34 and 86 effect tight joints with the casing. The ports 37 and 28 are however still covered or out of register. The pump, which is preferably steam driven, is now started, the valve 67 being closed and the valve 64 open, and water forced into the inner casing chamber 66 until the pump stalls. The inner casing is now rotated within the outer casing to register the ports 37 and 28 so that the water pressure in the inner casing acting upon the plunger 88, causes the ejection of cement to begin. With the falling of pressure due to the escaping cement, the pump again starts, maintaining a pressure in the casing and upon the plunger so that all of the bailer contents is expelled. Meanwhile, the casings and mold are kept in slow rotation to prevent freezing and to evenly spread and pack the cement, and at the same time, are being slowly drawn upwardly. If desired, the lower part of the mold may be slightly enlarged for the purpose of more tightly packing the cement when it is pulled. It should be noted that the upward movement of the casings and mold is so coördinated with the speed of injection of cement as to insure a mass of cement above the plane of discharge at all times; that is, instead of being ejected into the water in the bore and then settling through the water, it is ejected into the mass of cement just previously ejected, thus displacing the water from below, with a minimum contact therewith and with negligible dilution or admixture with mud.

When the casing has ascended about twenty feet, the pulling stops. The rotating mold has left a smooth bore in the initial increment of cement, and has deposited sufficient sand to completely fill the bore so that the still soft wall may be retained without danger of caving, until the cement has set. In order to avoid the formation of a vacuum in the mold chamber 39 above the sand, the port plug 77 is removed so that the water in the chamber 41 may flow through the passages 38 into the mold chamber.

When the pulling stops this port is closed, and the ports 37 and 28 are covered by rotation of the inner casing. The bailer is now pulled to the surface and out of the casing; the plunger is withdrawn and surplus cement in the bailer washed out. The valve 64 is then closed and the valve 67 opened, and water pumped into the chamber 41, through the passages 38, and upwardly through the bottom of the inside casing, washing the surplus cement out and carrying it to the top of the casing, from which the water discharges. The top of the casing is then closed and the inner casing is rotated to register the ports 37 and 28, and allow the water to discharge into the cement lying adjacent to the ports. This water washes out all the cement above the ports, which cement may be more or less mixed with caved material, so that the top surface of the increment just placed lies substantially on a level with the ports, i. e., the point of last injection. The cavings about the upper part of the casing are washed out at the same time. Two increments are now completed.

Rotation of the apparatus is now interrupted while the top joint of both inner and outer casing is unscrewed, and the housings or casing head reconnected to the next joints below. Except for necessary momentary stops, the apparatus is kept rotating at low speed throughout the operations just recited.

The placing of the third increment is next begun. Sand is introduced into the mold sufficient for twenty feet of core, and then the cement is injected, meanwhile rotating and pulling the mold to deposit the core for the second increment. The steps explained in connection with the placing of the second increment are repeated for each succeeding increment until the surface is reached. The well is now lined from top to bottom with a continuous wall of cement retained by a core of sand.

After the cement has set sufficiently, a string of casings is let into the well, water being injected under pressure to wash out the sand.

I claim:

1. The method of lining a well which consists in placing cement about a mold in the well, and depositing a retaining core within the lining when the mold is withdrawn.

2. The method of lining a well which consists in placing cement about a mold in the well, and rotating the mold within the cement and withdrawing the mold from the well.

3. The method of lining a well which consists in placing cement about a mold in the well, spreading and packing the cement by rotating the mold, withdrawing the mold and placing a retaining core within the lining when the mold is withdrawn.

4. The method of lining a well having water therein which consists in injecting an initial quantity of cement into the well about a mold therein, withdrawing the mold and continuing the injection of additional cement into that previously placed during the withdrawal of the mold.

5. The method of lining a well having water therein which consists in injecting an initial quantity of cement into the well about a mold therein, continuing the injection of additional cement into that previously placed during the withdrawal of the mold, and spreading and packing the cement by rotating the mold while it is being withdrawn.

6. The method of lining a well having water therein which consists in injecting an initial quantity of cement into the well about a mold therein, withdrawing the mold, continuing the injection of additional cement into that previously placed during the withdrawal of the mold, and placing a retaining core within the lining simultaneously with the withdrawal of the mold.

7. The method of lining a well which consists in conveying cement in a container into the well, ejecting said cement about a mold in the well, withdrawing the mold and placing a retaining core within the lining simultaneously with the withdrawal of the mold.

8. The method of lining a well which consists in conveying cement in a container into the well, ejecting an initial quantity of cement into the well about a mold therein, continuing the ejection of additional cement into that previously placed about the mold, and rotating and withdrawing the mold.

9. The method of lining a well which consists in conveying cement in a container into the well, ejecting an initial quantity of cement into the well about a mold therein, withdrawing the mold, continuing the ejection of additional cement into that previously placed about the mold, and placing a retaining core within the lining simultaneously with the withdrawal of the mold.

10. The method of lining a well which consists in conveying cement in a container into the well, ejecting an initial quantity of cement into the well about a mold therein, withdrawing the mold, continuing the ejection of additional cement into that previously placed about the mold, spreading and packing the cement by rotating the mold, and placing a retaining core within the lining simultaneously with the withdrawal of the mold.

11. The method of lining a well which consists in injecting cement into the well about a mold therein while withdrawing the mold and simultaneously placing a retaining core within the lining.

12. The method of lining a well which consists in injecting cement into the well about a mold therein while withdrawing the mold at a speed so proportioned to the speed of injection and the volume of the injected cement that a substantial mass of cement remains above the plane of the injecting material.

13. An apparatus for lining wells, comprising a mold, means for withdrawing the mold, and means for injecting cement only into the peripheral area of the well about the mold.

14. An apparatus for lining wells, comprising a mold, means for injecting cement only into the peripheral area of the well about the mold, and means for withdrawing the mold during the injection of the cement.

15. An apparatus for lining wells, comprising a mold, means for injecting cement into the well about the mold, and means for withdrawing and rotating the mold during the injection of the cement.

16. An apparatus for lining wells, comprising a mold, means for injecting cement into the well about the mold, and means for rotating the mold within the injected cement.

17. An apparatus for lining wells, comprising a mold, means for injecting cement into the well about the mold, means for withdrawing the mold, and means for depositing a retaining core within said lining simultaneously with the withdrawal of said mold.

18. An apparatus for lining wells, comprising a hollow mold adapted to contain a quantity of core-forming material, means for injecting cement into the well about said mold, and means for withdrawing said mold during the injecting of the cement whereby the core-forming material is deposited.

19. An apparatus for lining wells, comprising a hollow mold adapted to contain a quantity of core-forming material, means for injecting cement into the well about said mold, means for withdrawing said mold during the injecting of the cement whereby the core-forming material is deposited, and means for rotating said mold.

20. An apparatus for lining wells, comprising a mold, means for placing an initial increment of cement about said mold, means for withdrawing said mold from said initial increment, and means for injecting cement about said mold during said withdrawal to form a second increment continuous with the first.

21. An apparatus for lining wells, comprising a mold, means for placing an initial increment of cement about said mold, means for withdrawing said mold from said initial increment, means for injecting cement about said mold during said withdrawal to form a second increment continuous with the first, and means for rotating said mold.

22. An apparatus for lining wells, comprising a mold, a container for conveying cement to said mold, means for ejecting the cement from said container into the well about said mold, and means for withdrawing the said mold.

23. An apparatus for lining wells, comprising a hollow mold, means for permitting the introduction of sand into said mold, a container for conveying cement to said mold, means for ejecting the cement from said container into the well about said mold, and means for withdrawing said mold whereby said sand is deposited to form a retaining core for said lining.

24. An apparatus for lining a well, comprising a casing adapted to be run into the well, a mold arranged at the lower end of said casing, a bailer for conveying cement through the casing to said mold, means for establishing a passage between the inside of the bailer and the outside of the mold, and means for ejecting the cement in the bailer through said passage.

25. An apparatus for lining a well, comprising a casing adapted to be run into the well, a mold arranged at the lower end of said casing, a bailer for conveying cement through the casing to said mold, means for establishing a passage between the inside of the bailer and the outside of the mold, and means for creating a pressure within the casing to inject the cement from the bailer into the well about said mold.

26. An apparatus for lining a well, comprising a casing adapted to be run into the well, a mold arranged at the lower end of said casing, a bailer for conveying cement through the casing to said mold, means for establishing a passage between the inside of the bailer and the outside of the mold, means for ejecting the cement in the bailer through said passage, and means for rotating said casing to rotate said mold.

27. An apparatus for lining a well, comprising a casing adapted to be run into the well, a mold arranged at the lower end of said casing, a bailer for conveying cement through the casing to said mold, means for establishing a passage between the inside of the bailer and the outside of the mold, means for creating a pressure within the casing to inject the cement from the bailer into the well about said mold, and means for rotating said casing to rotate said mold.

28. An apparatus for lining a well, comprising a casing adapted to be run into the well, a mold arranged at the lower end of said casing, a bailer for conveying cement through the casing to said mold, means for establishing a passage between the inside of the bailer and the outside of the mold, means for creating a pressure within the casing to inject the cement from the bailer into the well about said mold, means for rotating said casing to rotate said mold, and means for withdrawing said mold.

29. An apparatus for lining a well, comprising a casing adapted to be run into the well, a hollow mold fixed on the end of said casing, means for permitting the introduction of a core-forming material into said mold, a bailer for conveying cement through the casing to said mold, means for establishing a passage between the inside of the bailer and the outside of the mold, means for ejecting the cement in the bailer through said passage, and means for withdrawing said mold whereby the core-forming material is deposited within said lining.

30. An apparatus for lining a well, comprising an outer casing adapted to be run into the well, a mold fixed on the end of said casing, an inner casing rotatably disposed within said outer casing and the contiguous end of said mold, said inner casing and said mold being provided with registerable ports, a container for conveying cement through said inner casing to said mold and having discharge ports therein adjacent the casing ports when the container is seated in its lower position, means for closing the container discharge ports during the movement of the container through the casing and for opening said discharge ports upon the seating of the container, means for packing the container in the inner casing, means for creating a pressure within the inner casing above the packing, means for permitting the pressure in the casing to act upon the cement in the container to eject it from the container through the casing ports when the latter are registered, and means for withdrawing the casing and mold a determined distance.

31. An apparatus for lining a well, comprising an outer casing adapted to be run into the well, a mold fixed on the end of said casing, an inner casing rotatably disposed within said outer casing and the contiguous end of said mold, said inner casing and said mold being provided with registerable ports, a container for conveying cement through said inner casing to said mold and having discharge ports therein adjacent the casing ports when the container is seated in its lower position, means for closing the container discharge ports during the movement of the container through the casing and for opening said discharge ports upon the seating of the container, means for packing the container in the inner casing, means for creating a pressure within the inner casing above the packing, means for permitting the pressure in the casing to act upon the cement in the container to eject it from the container through the casing ports when the latter are registered, means for withdrawing the casing and mold a determined distance, and means for rotating the casings and mold together.

32. An apparatus for lining a well, comprising an outer casing adapted to be run into the well, a hollow open bottom mold fixed on the end of said casing, an inner casing rotatably disposed within said outer casing and the contiguous end of said mold, said inner casing and said mold being provided with registerable ports in the sides thereof and a passage being formed in the end of the inner casing to permit the introduction of material into said mold, a container for conveying cement through said inner casing to said mold and having discharge ports therein adjacent the casing ports when the container is seated in its lower position, means for closing the container discharge ports during the movement of the container through the casing and for opening said discharge ports upon the seating of the container, means for packing the container in the casing above and below the discharge ports, means for introducing water under pressure into the inner casing above the packing, means for permitting said water to act upon the cement in the container to eject it from the container through the casing ports when the latter are registered, and means for rotating and withdrawing the mold and the casings.

33. An apparatus for lining a well, comprising an outer casing adapted to be run into the well, a hollow open bottom mold fixed on the end of said casing, an inner casing rotatably disposed within said outer casing and the contiguous end of said mold, said inner casing and said mold being provided with registerable ports in the sides thereof and a passage being formed in the end of the inner casing to permit the introduction of material into said mold, a container for conveying cement through said inner casing to said mold and having discharge ports therein adjacent the casing ports when the container is seated in its lower position, means for closing the container discharge ports during the movement of the container through the casing and for opening said discharge ports upon the seating of the container, means for packing the container in the casing above and below the discharge ports. means for introducing water under pressure into the inner casing above the packing, means for permitting said water to act upon the cement in the container to eject it from the container through the casing ports when the latter are registered, said casings being spaced apart to provide a chamber therebetween, and means for introducing water under pressure into said chamber, the ends of said inner casing being formed with passages connecting said chamber with the interior of said mold, and means for rotating and withdrawing the mold and the casings.

34. An apparatus for lining wells, comprising an outer casing adapted to be run into the well, a hollow mold fixed on the end of said casing, an inner casing spaced from said outer casing and forming a sliding fit in the contiguous end of said mold, said inner casing and said mold being provided with registerable ports and said inner casing being formed with passages connecting the mold chamber with the interior of the inner casing and with the chamber between the casings, a chambered housing surrounding the upper ends of said casings, means for connecting said chambered housing with a source of fluid under pressure, means for directing said fluid into the inner casing chamber or into the chamber between the casings, means for rotating said outer casing and said mold, and means for permitting the turning of the inner casing relative to the outer casing or for binding the inner casing for rotation with the outer casing.

35. An apparatus for lining wells, comprising a mold, means for placing an initial increment of cement about said mold, means for withdrawing said mold from said initial increment, means for injecting cement about said mold during said withdrawal to form a second increment continuous with the first, and means for washing out the cement above the point of last injection.

36. An apparatus for lining wells, comprising means for injecting successive increments of lining, and means for washing out that portion of each increment lying above the point of last injection.

37. An apparatus for lining wells, comprising means for injecting successive increments of lining, and means for depositing a retaining core in each increment as the next increment is placed.

38. In an apparatus for lining wells, an inner casing, a chambered upper housing surrounding said inner casing, a chambered ring rotatably arranged on said housing, apertures being formed in said housing wall to connect said housing chamber with said ring chamber, means for connecting said ring to a source of fluid under pressure, means for supporting said ring, a collar rotatably arranged on said ring, a chambered lower housing rotatably arranged about the lower end of the upper housing and supported on said collar, an outer casing attached to said lower housing and spaced from said inner casing, packing means arranged between the upper housing and the inner casing and the upper and lower housing, means for directing fluid from said upper housing chamber into the inner casing or into the lower housing chamber, and means for rotating said outer casing.

39. In an apparatus for lining wells, an inner casing, a chambered upper housing surrounding said inner casing, a chambered ring rotatably arranged on said housing, apertures being formed in said housing wall to connect said housing chamber with said ring chamber, means for connecting said ring to a source of fluid under pressure, means for supporting said ring, a collar rotatably arranged on said ring, a chambered lower housing rotatably arranged about the lower end of the upper housing and supported on said collar, an outer casing attached to said lower housing and spaced from said inner casing, packing means arranged between the upper housing and the inner casing and the upper and lower housing, means for directing fluid from said upper housing chamber into the inner casing or into the lower housing chamber, means for rotating said outer casing, and means for permitting the discharge of fluid from said lower housing chamber and from the upper part of said inner casing.

40. In an apparatus for lining wells, an inner casing, a chambered upper housing surrounding said inner casing, a chambered ring rotatably arranged on said housing, apertures being formed in said housing wall to connect said housing chamber with said ring chamber, means for connecting said ring to a source of fluid under pressure, means for supporting said ring, a collar rotatably arranged on said ring, a chambered lower housing rotatably arranged about the lower end of the upper housing and supported on said collar, an outer casing attached to said lower housing and spaced from said inner casing, packing means arranged between the upper housing and the inner casing and the upper and lower housing, means for directing fluid from said upper housing chamber into the inner casing or into the lower housing chamber, means for rotating said outer casing, a hollow mold secured to the end of said outer casing, an enlarged end of said inner casing forming a sliding fit with said mold, said mold and inner casing end being formed with ports registerable by turning said inner casing in said mold and said inner casing end being formed with passages connecting said mold chamber with the chamber between said casings and with the interior of the inner casing, a cement container adapted to be seated in said inner casing end and provided with discharge ports adjacent said casing ports, means for packing the container in said inner casing above and below said ports, and a plunger in said container operable by fluid pressure in said inner casing for effecting the ejection of cement from the container into the well about the mold.

41. The method of lining a well which comprises determining the volume of a section of the well, inserting a tubular form in the well opening, inserting a predetermined quantity of cementitious material into the well about the form and packing the cementitious material into position in such section of the well to form the lining.

42. The method of lining a well which comprises determining the width of a section of the well at various heights in such section and in various angular directions inserting a tubular form in the well opening, inserting about the form a quantity of cement predetermined from the volume of such section as determined by such measurements and packing the cementitious material into position in such section of the well to form the lining.

43. An apparatus for lining a well, comprising a recording device adapted to measure the volume of a section of the well, a tubular form for insertion in the measured well opening and means for packing a measured quantity of cementitious material around the form in such section of the well.

44. An apparatus for lining a well comprising a measuring device having a plurality of members pressed resiliently laterally against the sides of the well, means for moving the device vertically through a section of the well, means for recording the lateral position of the members at each point along such section of the well, a tubular form for insertion in the measured well opening and means for packing a measured quantity of cementitious material around the form in such section of the well.

45. The method of lining a well which consists in placing cement about a hollow mold in the well, withdrawing the mold, and filling the space formerly occupied by the mold by flowing into said space added materials which prevent the cement lining from collapsing.

In testimony whereof I have hereunto subscribed my name in the presence of two subscribing witnesses.

JEAN AMEDÉE HARDEL.

Witnesses:
RIDSDALE ELLIS,
EARL M. HARDINE.